United States Patent [19]
Cadman et al.

[11] Patent Number: 5,507,326
[45] Date of Patent: Apr. 16, 1996

[54] FLUID OVERFILL PROTECTION AND PRODUCT IDENTIFICATION SYSTEM

[75] Inventors: Gary R. Cadman, Norwell; Jagjit S. Thiara, Southborough, both of Mass.

[73] Assignee: Scully Signal Company, Wilmington, Mass.

[21] Appl. No.: 286,701

[22] Filed: Aug. 5, 1994

[51] Int. Cl.⁶ .................................................. B67D 5/33
[52] U.S. Cl. ........................... 141/198; 141/1; 141/5; 141/7; 141/59; 141/231; 141/346; 141/351; 141/95; 73/290 R; 73/293; 340/618; 340/619; 340/825.34
[58] Field of Search ........................ 141/1, 2, 4, 5, 141/7, 9, 94–96, 59, 83, 192, 198, 231, 346, 351; 250/900–903; 340/618, 619, 825.34; 73/290 R, 293

[56] References Cited

U.S. PATENT DOCUMENTS

| | | | |
|---|---|---|---|
| 2,921,469 | 1/1960 | Newton | 73/290 R |
| 3,209,350 | 9/1965 | Davis et al. | 340/825.34 |
| 4,075,675 | 2/1978 | Burkett et al. | 361/48 |
| 4,313,228 | 1/1982 | Berstein | 340/619 X |
| 4,598,742 | 7/1986 | Taylor | 141/95 |
| 4,846,233 | 7/1989 | Fockens | 141/94 |
| 4,901,195 | 2/1990 | Stemporzewski, Jr. | 361/217 |
| 4,915,145 | 4/1990 | Schirmacher | 141/95 |
| 5,008,661 | 4/1991 | Raj | 340/825.34 X |
| 5,159,523 | 10/1992 | Claassen et al. | 361/215 |
| 5,204,819 | 4/1993 | Ryan | 364/465 |
| 5,214,582 | 5/1993 | Gray | 364/424.03 |
| 5,249,129 | 9/1993 | Lamoureux et al. | 364/479 |

FOREIGN PATENT DOCUMENTS

| | | | |
|---|---|---|---|
| 0440299 | 8/1991 | European Pat. Off. | 141/198 |
| 4119677 | 12/1992 | Germany | 141/231 |
| 1294497 | 11/1989 | Japan | 141/95 |
| 5278797 | 10/1993 | Japan | 141/95 |

Primary Examiner—J. Casimer Jacyna
Attorney, Agent, or Firm—Bookstein & Kudirka

[57] ABSTRACT

A fluid overfill and identification system uses a pulsed signal to both detect an overfill condition and identify a fluid product contained in a compartment. The pulsed signal is converted into an optical pulsed signal which is used with a retroreflective prism to detect when a fluid in the compartment has reached a desired capacity. Encoded in the pulse width of the same pulsed signal is the specific fluid product located in the compartment. Furthermore, different pulse frequencies are provided depending on whether the tanker truck is at a service station or at a loading terminal, thus allowing the system to distinguish between the two. At a marketing terminal, a new code is loaded into the system as a new fluid product is loaded into a compartment. A residue sensor may detect residual fluid in the compartment, and prevent the loading of a new fluid product and a new ID code.

32 Claims, 4 Drawing Sheets

FLUID OVERFILL PROTECTION AND PRODUCT IDENTIFICATION SYSTEM

FIELD OF THE INVENTION

This invention relates to the field of fluid product transfer, and particularly to the transportation and transfer of flammable fluids such as petroleum products.

BACKGROUND OF THE INVENTION

Tanks used for storing or transporting flammable fluids such as gasoline, diesel fuel and other hazardous petroleum products are often equipped with overfill protection devices. When the fluids are being transferred from the storage tanks to recipient tanks, these devices detect when the recipient tanks are full and automatically disable the transfer process. Thus, waste is avoided and the environment is protected from spillage due to overfilling.

Tanks can be mounted on tanker trucks or located underground at service stations. Tanker trucks are typically filled with the fluids using pumping equipment at the loading racks of marketing terminals, and underground storage tanks are typically gravity-filled from the trucks. An overfill protection device is used with each tank to disable the pumping equipment at the marketing terminals or to close a truck-mounted flow valve at the service station when the limit of the recipient tank's capacity is reached.

Typically, an overfill protection device has a detection circuit and a disable circuit. The detection circuit has a sensor located within the tank which generates an electrical sensor signal indicating when the fluid in the tank exceeds a pre-determined level. The detection circuit is connected to the disable circuit by an electrical cable used to communicate the sensor signal to the disable circuit. When the signal indicates that the fluid level in the recipient tank has reached a desired capacity, the disable circuit responds by stopping the fluid flow into the tank (by disabling the pumping equipment at the loading rack or by closing the flow valve on the truck).

One embodiment of the detection circuit generates a pulsed signal for use with a sensor which converts it into an optical pulse signal that is reflected from a prism in a storage tank to a light detector when the fluid level is below a desired capacity. In response, the light detector generates a pulsed signal which is returned to the detector circuit. When the fluid level in the tank reaches the desired capacity, the indices of a refraction between the prism and the surrounding fluid prevent reflection of the optical pulse signal to the light detector. The light detector thus ceases to generate the pulsed signal and the system responds by disabling fluid flow into the tank, thus preventing an overfill condition.

Although such level sensing sensors are useful for preventing the overfill of recipient tanks, they are unable to identify the type of fluid being introduced into the tank. Thus, on occasion, situations arise where a particular fluid is accidentally introduced into a tank intended for a fluid of a different grade or a different fluid altogether. This usually results in the fluid introduced mixing with the residual fluid in the tank sometimes rendering it useless. Such mixing of products may also cause damage or create a safety hazard. In addition, the mixed fluid often must be discarded, creating a difficult and expensive disposal job.

SUMMARY OF THE INVENTION

The present invention provides a fluid transfer system which generates a pulsed signal output and uses the same pulsed signal for both overfill detection and product identification.

The pulsed signal is detected by an overfill detection circuit which, in turn, provides a signal to a disable circuit which controls a valve through which the fluid flows while being transferred to a recipient tank. When the pulsed signal is absent, the overfill detection circuit indicates the absence in its output signal. The disable circuit, detecting this change in the output signal, responds by closing the valve to prevent fluid flow.

The pulsed signal is also detected by an ID circuit which responds to both the pulse frequency and the pulse width of the signal. Both the detection circuit and the ID circuit are part of a controller on the truck, and may be integrated into a single microcontroller. Different pulse frequencies are used depending on whether the tanker truck is at a marketing terminal being filled or at a service station offloading its fluid product, and the ID circuit responds with different actions depending on the frequency of the pulse signal.

When the tanker truck is at a service station, the purpose of the ID circuit is to prevent the introduction of a fluid product into a tank of the service station not intended for that product. Within the ID circuit is stored a digital code indicative of the fluid product which is presently in the tanker truck compartment served by that ID circuit. When the hose from that compartment is connected to a service station tank, the pulsed signal generated by the sensor in the tank is detected by the ID circuit, and the detected pulse width is converted into a digital code. The pulse width of the pulses generated by the sensor in the service station tank is indicative of the product for which the tank is intended. Therefore, the ID circuit compares the newly acquired code to the code stored in memory, and if they do not match, the ID circuit signals a valve to prevent the flow of fluid product into that tank.

At the marketing terminal, a pulse generator associated with each terminal product loading arm generates a pulse at a frequency different than the frequency used for the service station tanks. In addition, the pulse width of the loading arm pulse signal is indicative of the fluid product being dispensed by that loading arm. When the loading arm is connected to a compartment of the tanker truck, the pulse generator for that loading arm is electrically connected to the controller on the truck. The pulse generator output is detected by the ID circuit, and the pulse width converted into a digital code. Based on the frequency of the pulsed signal, the ID circuit changes its operation from that just described. Instead of comparing this code to that stored in memory, the newly-acquired code is loaded into the ID circuit memory, replacing the old code. Thus, as a new fluid product is loaded into the compartment, so is a new code identifying that product loaded into the ID circuit.

At the marketing terminal, the same signal is typically not used for overfill detection as is used for transmitting the ID code. This is because the ID pulse generators at the marketing terminal are located on the product loading arms, and need only be input to the controller. Since a separate overfill device, permanently mounted on the truck, may be directly connected to the pumps at the marketing terminal, integration of the two functions is not necessary. However, such an arrangement is certainly possible and is considered anticipated by the present invention.

In one alternative marketing terminal embodiment, a residual sensor is located at the bottom of the tanker compartment, and functions in essentially the same way as the overfill sensor. If the level of the fluid is below the sensor, a signal is provided which is detected by the controller. If the level of the fluid reaches the sensor level, the signal is no longer output by the sensor. Thus, the output signal changes (from low to high) and provides a signal to the controller only when there is a negligible amount of product left in the compartment. Upon detecting this latter signal, the ID circuit prevents the loading of a new code, and instead compares the code of the connected loading arm to the stored code representing the residual fluid product. If these codes do not match, the transfer of fluid product from the loading arm to the tanker compartment is inhibited.

DETAILED DESCRIPTION OF A PREFERRED EMBODIMENT

Figure 1:
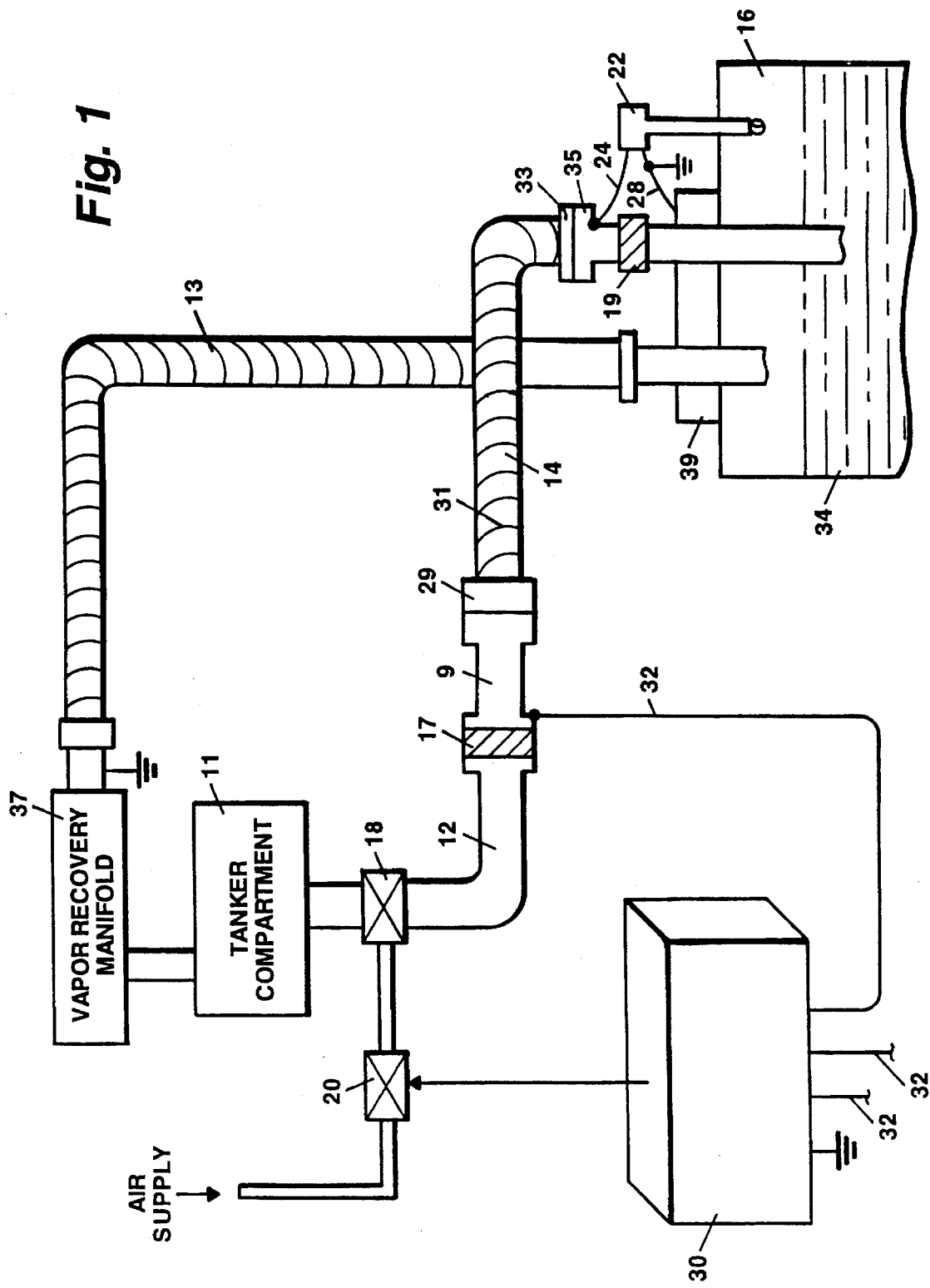
FIG. 1 is a schematic view of a fluid transfer system during offloading of fluid from a tanker compartment to a service station tank.

Shown in FIG. 1 is a filling arm 12 of a tanker truck connected to a hose 14, which is a transfer conduit used to fill the underground tank 16 of a service station. When the arm 12 and hose are securely connected to the tank, a fluid product, such as gasoline, may be offloaded from a compartment 11 of the truck to the tank 16 by gravity. The flow of fluid is controlled by pneumatically controlled valve 18 which is in turn controlled by electrically-controlled air valve 20. The use of an air-controlled valve 18 avoids the explosion danger which might exist if an electrically-controlled valve were used in place of the valve 18.

Located at the top of the tank 16 is a sensor 22 which senses the fluid level in the tank and provides an output signal indicative of the fluid reaching a predetermined level in the tank. A signal wire 24 of the sensor 22 is attached to an electrically conductive reinforcing wire which runs the length of hose 14, while a ground wire 28 is attached to a surface of tank 16, which is grounded. The reinforcing wire is located to the inside of the hose casing to prevent accidental signal discharge against a conductive surface. The signal wire 24 and ground wire 28 are used to transmit low-current electrical signals between the sensor 22 and a controller 30 which is located on the truck. As described below, these signals are used to indicate to the controller whether or not the fluid level has exceeded the predetermined capacity level and, therefore, whether or not the valve 18 should be closed.

As shown in FIG. 1, the controller 30 has a signal wire 32 which connects the controller to a conductive coupling 9 which is, in turn, connected to a conductive coupling 29 of hose 14. The conductive coupling 29 is in electrical contact with the reinforcing wire 31 of the hose 14. The reinforcing wire 31 is used to conduct the desired electrical signals and makes electrical contact with hose coupler 33 of hose 14. This coupler 33, when in physical contact with the corresponding coupler 35 of the service station tank conducts signals to sensor 22 via signal wire 24.

An insulating ring 17 electrically isolates the conductive portion of the hose from the pipe 12. Another insulating ring 19 electrically isolates hose 14 from tank 16, which is grounded. Thus, the sensor signal can be transmitted to the controller 30 via the hose 14. In the preferred embodiment, the hose coupler 33 is a female coupler which mates with a male coupling 35 of the service station tank 16, such that an electrical connection between the signal wire 24 and the controller 30 is made whenever the hose 14 is connected to the tank.

While the sensor signal is conducted along fluid hose 14, the common ground is conducted along a vapor recovery hose 13 which is also connected to tank 16 while it is filled. As fluid product is transferred from truck compartment 11 into tank 16, the product vapor in the tank 16 is displaced, travelling through vapor recovery hose 13 and back into a vapor recovery manifold 37 which distributes the vapor to the various compartments of the truck, including compartment 11. A reinforcing wire of the vapor recovery hose 13, similar to that of the fluid hose 14, is the conductor for the hose 13. The reinforcing wire provides an electrical pathway between the top 39 of tank 16 (to which the sensor ground wire 28 is connected) to a conductive portion of vapor recovery manifold 37. The vapor recovery manifold is in conductive contact with the truck chassis. The controller ground wire is also connected to the chassis of the tanker truck. This completes the common ground connection between the sensor and the controller. In an alternative embodiment where vapors are not recovered by the system, a common ground connection can be completed by connecting a single conductor cable from the truck chassis to a service station tank piping using clamps at the ends of the cable.

Figure 2:
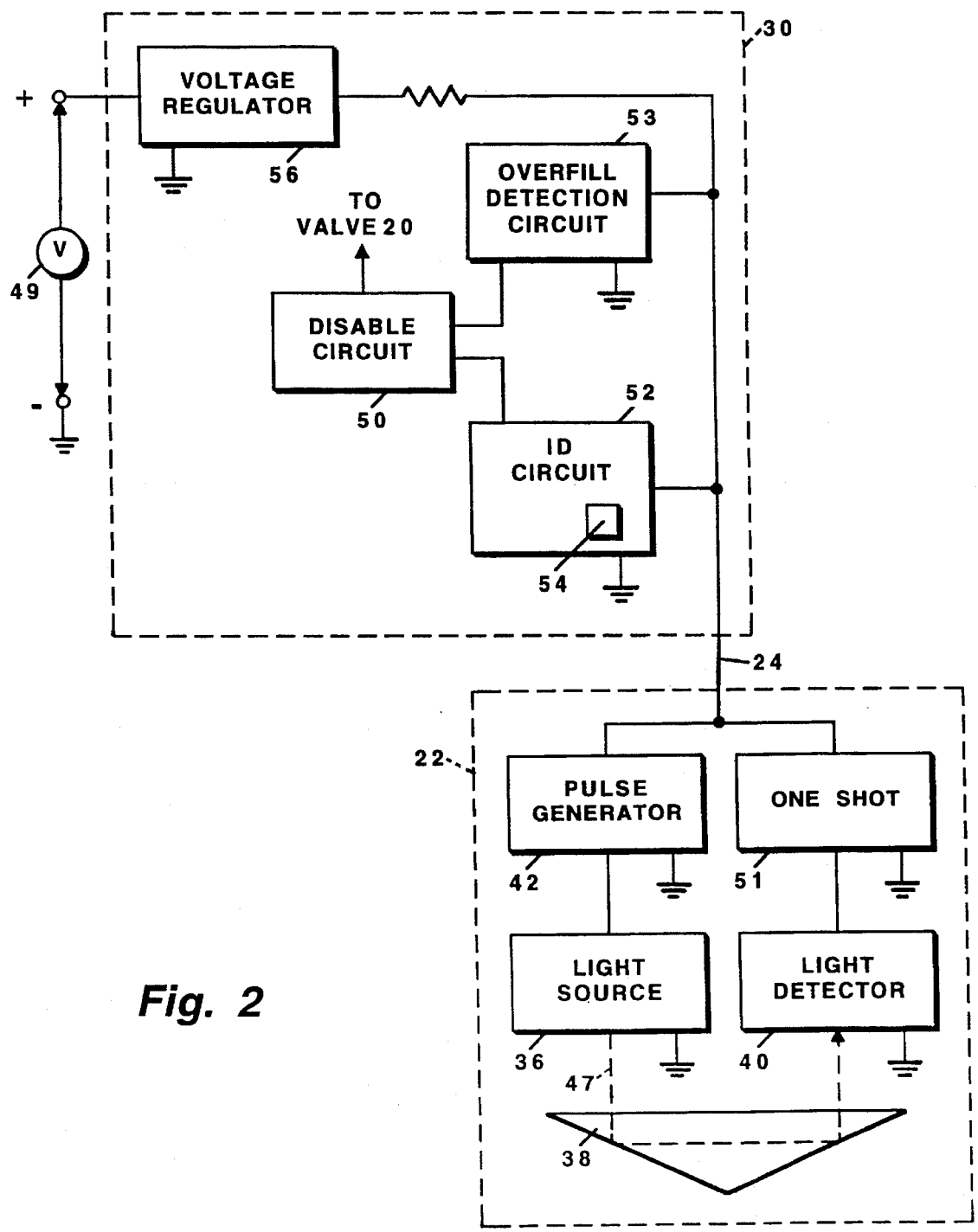
FIG. 2 is a block diagram of the fluid transfer system of FIG. 1.

The control circuitry of the present invention can be better understood by the block diagram of FIG. 2. The sensor 22 components include a pulse generator 42, a light source 36, such as a light-emitting diode (LED), a corner prism 38, a light detector 40, such as a phototransistor, and a one-shot pulse generator 51. The light source 36, the prism 38 and the light detector 40 are arranged in an optical path 47 schematically shown in FIG. 2. In this arrangement, power to the light source 36 causes it to generate light directed toward the prism 38.

Pulse generator 42 may be a 555-type timer or the like which is adjusted to periodically generate electric pulses that are input to the light source 36. In response to the electrical pulses, the light source generates corresponding optical pulses. It is these optical pulses which are transmitted through the above-mentioned optical pathway and which enable the sensor to detect when an overfill condition has occurred.

When the prism 38 is located above the level of fluid 34 (see FIG. 1) in the tank 16 (i.e. the prism 38 is "dry") the indices of refraction of the prism 38 and the surrounding air are such that the prism 38 acts as a retroreflector. Consequently, the light is reflected off two surfaces of the prism and directed toward the light detector 40. However, when the prism 38 is submerged in the fluid 34, the relative indices of refraction of the prism and the surrounding fluid are such that the light transmits through the surface of the prism and is not reflected to detector 40. Thus, the light detector 40 receives the pulsed light signal only when the fluid level in the tank is below the desired capacity and, in response, the light detector 40 generates a pulsed electrical signal which triggers the one-shot 51. The one-shot drives signal wire 24 low for a selected duration.

The sensor 22 is in electrical communication with the controller 30 via signal wire 24 and the electrical path through the hose 14, and is tied to a common ground with the controller via ground wire 28 and the electrical path through the vapor recovery hose 13. The signal wire 24 is depicted in FIG. 2 as being connected directly to the controller, but it will be understood that the connection also includes the pathways through the fluid hose 14 and the signal wire 32. Transmitted along the signal wire 24 is a DC power signal from truck power source 49 which is regulated by voltage regulator 56. The voltage regulator 56 puts out a constant DC voltage which powers all of the components of the system, including those of the sensor 22. Thus, each of the sensor's electrical components 42, 36, 40 and 51 is powered up only while the hose 14 is connected to the tank 16.

In addition to powering the sensor circuitry, the controller 30 must also receive the signal output by one-shot 51. In the preferred embodiment, the output of one-shot 51 (a pulsed signal) is conducted to the controller 30 on the same signal wire 24 which carries DC power to the sensor 22. Despite the presence of the DC power signal on the signal wire 24, the time-varying characteristic of the pulsed output signal of sensor 22 modulates the D.C. signal, and is ultimately detected by the controller 30.

While the controller is receiving the pulsed signal from sensor 22, it detects this signal with overfill detection circuit 53 and ID circuit 52. The outputs of these two circuits are in turn passed to disable circuit 50, and used in determining the control of valve 18 of the tanker truck. When the prism is above the fluid level in tank 16, the presence of the pulsed signal from sensor 22 is detected on the signal line 24 by overfill detection circuit 53. This information is relayed to disable circuit 50 which responds by allowing the continued flow of fluid through valve 20. However, when the prism 26 is submerged in fluid, and the output of light detector 40 is correspondingly suspended, the output signal of the overfill detection circuit 53 changes, and the disable circuit responds to the change by closing valve 18 to prevent any further fluid flow into the tank 16.

Referring to FIG. 2, it can be seen that output of sensor 22 causes a detectable voltage signal on signal line 24. This signal is detected as a series of pulses by both the overfill detection circuit 53 and the ID circuit 52. The disable circuit 50 responds to a signal from the overfill detection circuit, and does not disable the valve 18 as long as that signal indicates that the pulses are still being received. However, once the pulses are no longer detected by the overfill detection circuit 53, it signals the the disable circuit 50 to discontinue the fluid flow by closing the valve 18.

The ID circuit 52 detects the pulses, but also discerns between pulses of different widths. In the preferred embodiment, the ID circuit 52, the overfill detection circuit 53 and the disable circuit are all part of a single processing unit, preferably a microprocessor. The ID circuit portion of this microprocessor transforms the specific pulse width contained in the sensor signal into a digital code in a conventional manner. Since, in the preferred embodiment, there may be as many as twelve different fluid products to identify (although, obviously, the invention may be adapted for as many as required), the ID codes are 4-bit codes (allowing 16 different possible codes). It will be understood that the ID circuit microprocessor may use longer or shorter digital codes as may be desired. In addition, as just one example of the possible alternatives for encoding the product type in the time-varying characteristic of the pulsed signal, the ID circuit 52 may detect the duty cycle of the pulses, or even the signal frequency, instead of the pulse width.

The ID circuit 52 monitors the pulse stream and generates a 4-bit digital value representative of the width of each received pulse. The ID circuit also responds to the frequency of the pulses. A pulse frequency of, for example, 10 Hz is generated by the pulse generator of the service station tank sensor. However, as will be discussed in further detail below, in the preferred embodiment, a different frequency is used by a pulse generator at the marketing terminal where the tanker is loaded, to allow the ID circuit 52 to distinguish between the two locations. A 10 Hz frequency is used in the preferred embodiment because it is slow enough to allow a number of different, easily-discernible pulse widths, but is still fast enough that the disable circuit will respond quickly to an overfill condition.

When the ID circuit 52 detects the service station frequency (in this case 10 Hz), it compares the digital code which represents the received pulse stream to a previously-stored digital code stored in memory 54. The previously-stored code is representative of the particular fluid product which is presently in the compartment 11 of the tanker. Meanwhile, the sensor 22 of the service station tank 16 to which the hose 14 is connected generates pulses with a width specific to the fluid product which is to be stored in that tank. When the pulses originating from sensor 22 are transformed by ID circuit 52, the resulting digital code must match the stored digital code. If the codes match, then the fluid product in the truck compartment is appropriate for that service station tank, and the ID verification circuit 52 signals the disable circuit 50 to allow the opening of valve 18 and the dispensing of fluid into the tank 16. However, if the codes do not match, then the fluid is not appropriate for the tank to which the hose is connected, and the ID circuit 52 signals the disable circuit to inhibit the flow of any fluid through valve 18.

As mentioned, the ID circuit 52 is sensitive to pulse frequency as well as pulse width. This allows the ID circuit to distinguish a service station tank from a marketing terminal loading arm. A similar pulse stream may be input to the ID circuit 52 while the compartment 11 is connected to the loading arm. The ID circuit can detect the width of these pulses and transform it into a new digital code which may be loaded at the same time that a new fluid product is loaded.

Figure 3:
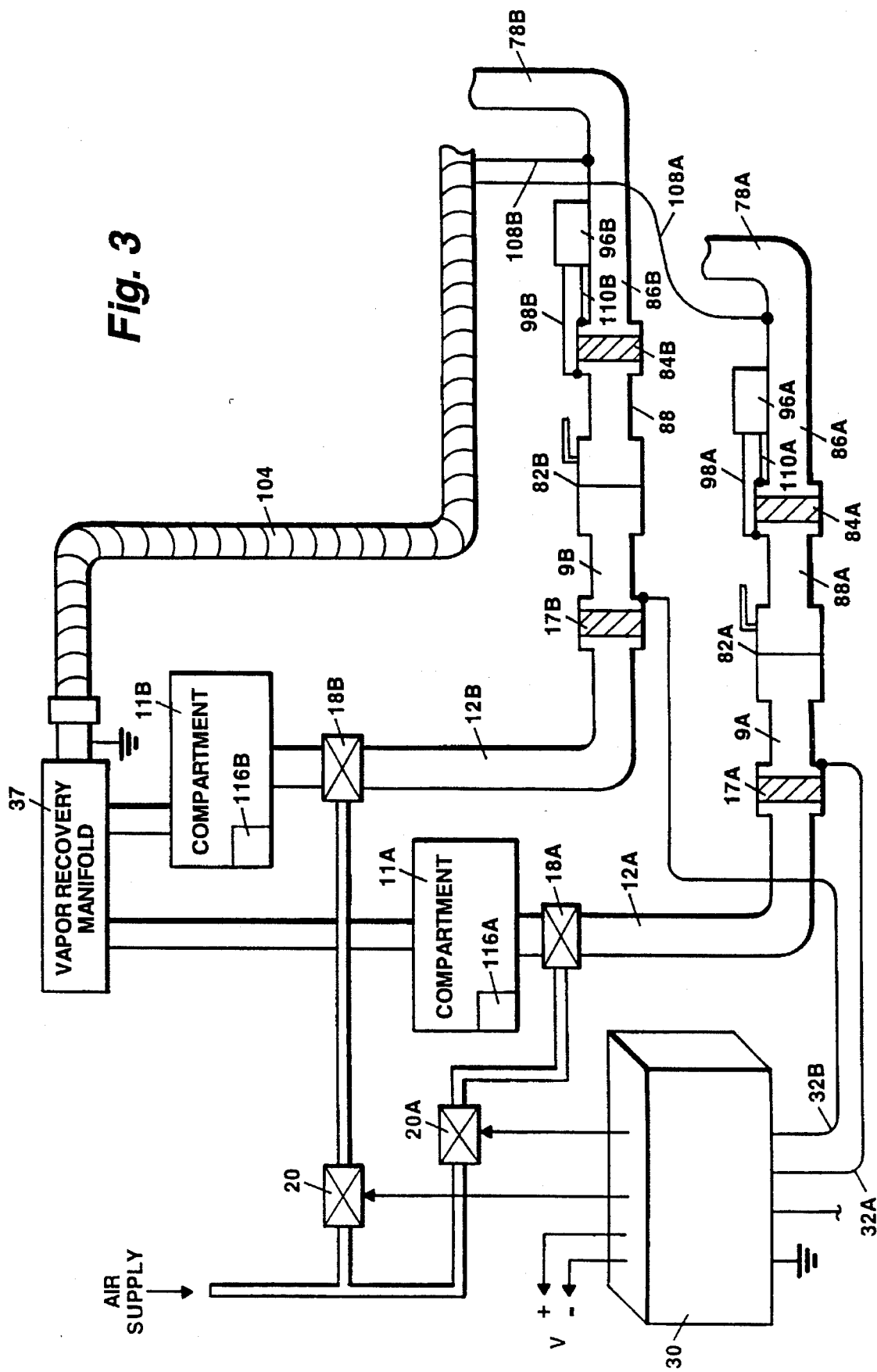
FIG. 3 is a schematic view of the fluid transfer system of FIG. 1 during loading of fluid into tanker compartments from a marketing terminal.

Shown schematically in FIG. 3 is a connection between different compartments of a tanker truck and different loading arms of a marketing terminal. In the figure, "A" and "B" designations are used with the reference numerals to distinguish similar components of two different connections. For example, the two loading arms shown in the figure are designated 78A and 78B.

Each loading arm 78A, 78B dispenses a different fluid product which is loaded into a different compartment 11A, 11B of the tanker truck. Each loading arm connects to a truck arm 12A, 12B by a coupling connection 82A, 82B as is known in the art for simplicity, the following description refers to only a single loading arm connection. However, it will be understood that a plurality of different loading arms may be simultaneously connected to a plurality of different truck arms to load different fluid products into different compartments of the tanker truck, and that the description applies to each of these arrangements.

Each loading arm 78A, 78B comprises an electrically conductive material, as does each truck arm 12A, 12B. An insulator 84A, 84B provides electrical isolation between the two different conductive portions (86A and 88A or 86B and 88B) of each loading arm 78A, 78B. Similarly, an insulator 17A, 17B provides electrical isolation between the two different conductive portions its respective truck arm 12A, 12B. Each of these arms is broken down into two conductive portions so that it may be used to carry electrical signals.

The electrical signals being transmitted are electrical pulses generated by pulse generator 96A, 96B, which is located on its respective loading arm 78A, 78B. Each pulse generator 96A, 96B is supplied power from the controller 30 via the conductive connection path including a signal wire 32A, 32B, coupling 9A, 9B, coupling 88A, 88B and signal wire 98A, 98B. When powered, each pulse generator 96A, 96B outputs a regular sequence of electrical pulses. In essence, the pulse generators each function as a sensor 22, but without an interruptable optical signal pathway. Therefore, as long as a pulse generator is receiving power, it outputs a pulsed signal.

Although the pulse generators 96A, 96B output pulses at the same frequency, each generator 96A, 96B generates pulses of a discernibly different width. Like the pulses generated by the service station sensor, the particular pulse width output by a generator 96A, 96B indicates the fluid product being dispensed by that respective loading arm 78A, 78B.

The pulses from each pulse generator 96A, 96B are output on a conductor 98A, 98B to conductive portion 88A, 88B of the respective loading arm 78A, 78B. The pulse signal is transmitted through the coupling connection 82A, 82B to conductive portion 9A, 9B of truck arm 12A, 12B. The signal is from there detected by the controller 30 via a respective signal wire 32A, 32B. A common ground connection is established between controller 30 and the pulse generators 96A, 96B through a conductive connection which passes from vapor recovery manifold 37 to a reinforcing wire in vapor recovery hose 104 and finally to ground wires 108A, 108B, each of which connects to the grounded portion of its respective terminal loading arm 78A, 78B. Like the vapor recovery system used at the service station, the vapor recovery hose 104 and the manifold 37 are used to recover vapor displaced from the compartments 11A, 11B as they are filled with fluid.

As shown, a ground connection 110A, 110B of each pulse generator 96A, 96B also connects to the conductive portion 86A, 86B or its respective loading arm 78A, 78B. With conductive connection made between the pulse generator 96A, 96B of each loading arm and the controller 30, the ID circuit 52 of the controller can detect the pulses output by each generator 96A, 96B. As with the sensor 22, the pulses modulate the DC signal which is used to power the generators 96A, 96B and which is transmitted along the same conductive path as the pulsed signals. The ID circuit 52 detects both the width and the frequency of the pulses input from the generators 96A, 96B. The frequency of the pulses from the loading arm pulse generators 96A, 96B is discernibly different from the pulse frequency of the service station pulse generators 42, and in the preferred embodiment is 15 Hz.

Upon detecting a particular generator signal, the ID circuit 52 transforms the detected pulse width into a 4-bit digital code, but because of the detected 15 Hz frequency it does not begin a comparison with the stored digital code. Instead, the ID circuit 52 responds by storing the new digital code (which represents the fluid product dispensed by the loading arm 78A, 78B on which the particular generator 96A, 96B resides) in place of the code previously stored in memory 54 for the compartment 11A, 11B to which that arm is connected. Thus, as a new fluid product is loaded into a particular compartment 11A, 11B, the stored code is changed to match the code which represents the new fluid product type. Upon delivery of this new product to a service station, the new code of this particular compartment 11A, 11B must now be matched by the signal from sensor 22 of the service station, or the ID circuit will prevent the off-loading of the new fluid product in the manner discussed previously.

In one alternative embodiment of the invention, a residue sensor 116A, 116B is added which resides at the bottom of its respective tanker compartment 11A, 11B. (Alternatively the sensor may reside at the lowest elevation point of arm 12. In such a case, coupling 9A, 9B is a coupling of known design which allows fluid flow through it only when a physical connection is made to another coupling). The sensor functions such that an output signal from the sensor 116A, 116B is only present when the tank is substantially empty. The signal is used as an override by the controller to inhibit the normal procedure when the tanker compartment is being filled at the marketing terminal.

If the signal from the residue sensor 116A, 116B indicates that the respective compartment 11A, 11B is empty, then the refilling of the compartment and the changing of the digital code in the ID circuit 52 proceeds as described above. If, however, the signal from the residue sensor indicates that the compartment is still partially filled with a fluid product, the ID circuit 52 instead performs a code comparison essentially identical to that performed at the service station. That is, it compares the code generated from the pulse signal of the appropriate loading arm pulse generator 96A, 96B to the stored digital code (which still indicates the fluid product stored in corresponding compartment 11A, 11B), and prevents the flow of new fluid into the compartment if the codes do not match. Of course, if the codes do match, the fluid flow is not prevented. This prevents the accidental mixing of two different fluid products in the tanker compartment. Since, if the codes match, the fluid products are the same, it is not necessary to store the new digital code in the ID circuit memory.

Figure 4:
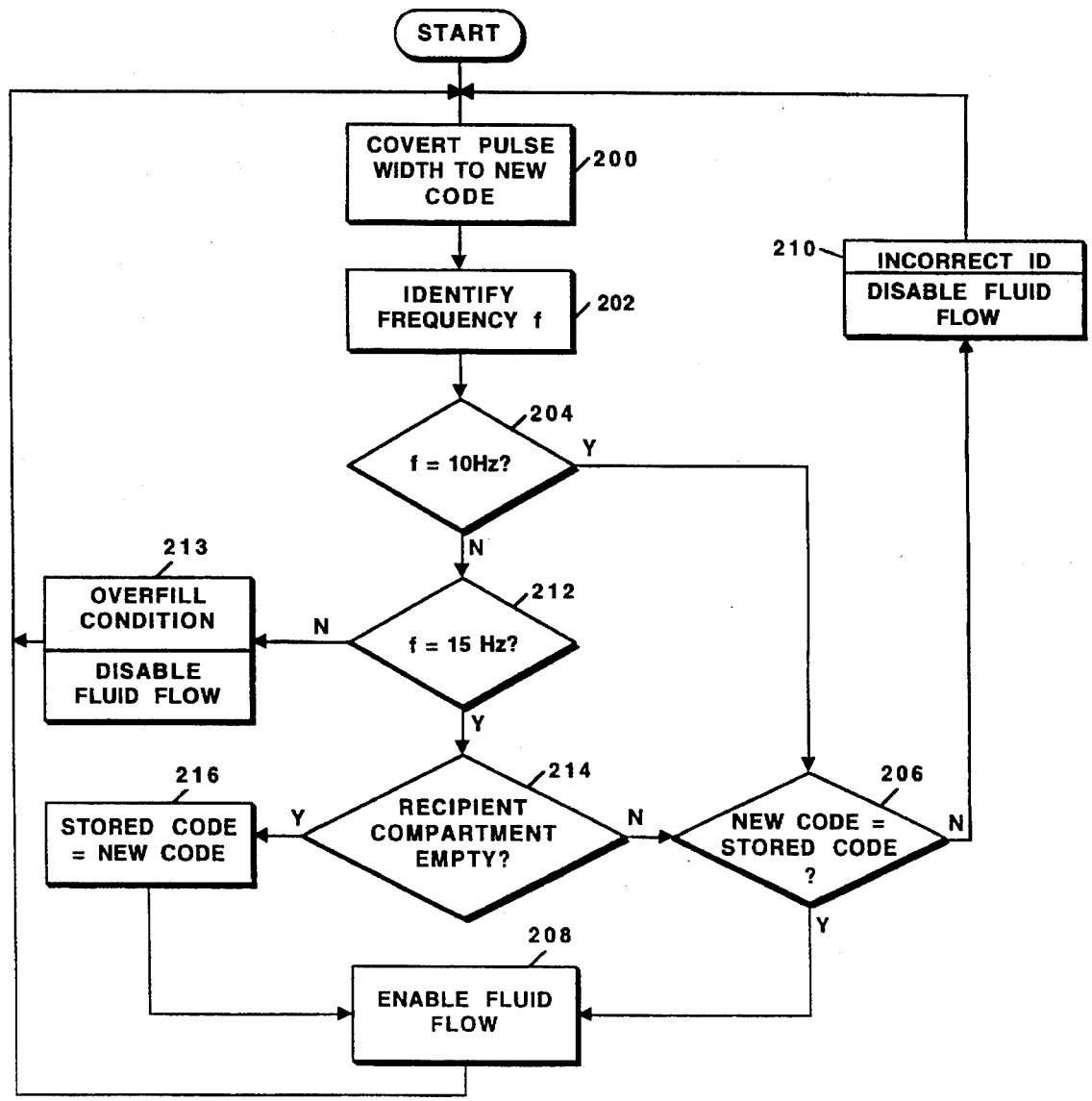
FIG. 4 is a flow diagram describing the operation of the fluid transfer system of FIG. 1.

Shown in FIG. 4 is a flow chart which summarizes the operation of the present invention for controlling fluid flow to or from one of the tanker compartments. Once there is connection made from the truck to the service station tank or marketing terminal, the system usually starts receiving the pulsed signal at step 200, the pulse width is converted to a new digital code. The frequency of the pulsed signal is also determined by the controller 30 at step 202. If the frequency is determined to be 10 Hz at step 204 (indicating that the signal is from the tank 16 at the service station), the controller then determines (at step 206) whether the new code equals the stored digital code (i.e. whether the fluid products match). If the codes match, then the fluid flow is enabled at step 208. If the codes do not match, then the fluid flow is disabled (step 210).

If the frequency of the signal is not 10 Hz, the controller then determines at step 212 whether the frequency is 15 Hz (indicating that the truck is at the marketing terminal). If the frequency is also not 15 Hz, then the fluid flow is disabled (step 213). If the frequency is 15 Hz, then the controller checks the signal from the residual sensor 116 and determines whether the recipient compartment is empty (step 214). If the compartment is empty, the new code is stored in place of the previously stored code (step 216) and the fluid flow is enabled at step 208.

If the compartment is not empty, then the controller compares the new code to the old code (step 206). If the new code matches the old code (meaning the fluid in the compartment matches the fluid being dispensed into the compartment), then the fluid flow is enabled (step 208). However, if the two codes do not match (meaning the fluid in the compartment does not match that being dispensed by the attached loading arm), then the fluid flow is disabled at step 210.

The present invention provides an integrated system which uses a pulse signal to simultaneously detect overfill and identify and track fluid products. It should be noted that simultaneous transfer of fluid products to or from different tanker compartments (i.e. at the marketing terminal or at the service station) is considered to be within the scope of the invention. It is an intention of the invention to have a single controller 30 on the tanker truck which controls the transfers to or from the various compartments, although multiple controllers might also be used. It is also contemplated to control fluid flow at the marketing terminal by a flow controller such as valve 18 of the compartment, or a flow controller such as the terminal pump which shuts down in response to a signal from controller 30.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A fluid transfer system for transferring a fluid from a first tank to a second tank through a transfer conduit using a flow controller to control the flow of fluid through the conduit, the system comprising:
    a level sensor which detects fluid level in the second tank and which outputs a first signal indicating whether the fluid level in the second tank is above a predetermined level, the first signal having a first time-varying characteristic which is indicative of a specific fluid for which the second tank is intended;
    an overfill detector which detects the first signal and causes the flow controller to inhibit fluid flow through the conduit when the first signal indicates that the fluid level in the second tank is above said predetermined level; and
    an ID detector which detects the first signal and compares said first time-varying characteristic to a stored representation of a reference time-varying characteristic indicative of the specific fluid contained within the first tank, and which causes the flow controller to inhibit fluid flow through the conduit if the two characteristics are not sufficiently similar.

2. A fluid transfer system according to claim 1 wherein the first tank is a compartment of a tanker truck and the second tank is an underground storage tank of a service station.

3. A fluid transfer system according to claim 1 where the sensor comprises an electro-optic sensor.

4. A fluid transfer system according to claim 1 wherein said first signal is a pulsed signal.

5. The fluid transfer system according to claim 4 wherein said first time-varying characteristic is the width of pulses of said pulsed signal.

6. A fluid transfer system according to claim 5 wherein the first time-varying characteristic is a duty cycle of the pulsed signal.

7. A fluid transfer system according to claim 5 wherein the first time-varying characteristic is a frequency of said pulsed signal.

8. A fluid transfer system according to claim 1 wherein the stored representation of a reference time-varying characteristic is a digital code.

9. A fluid transfer system according to claim 8 further comprising an electrical conductor which runs along the length of the transfer conduit and by which the first signal is transmitted.

10. A fluid transfer system according to claim 9 further comprising a vapor recovery hose through which fluid vapor is transferred from the second tank to the first tank as fluid is transferred from the first tank to the second tank, said vapor recovery hose having a conductor along which an electrical ground path is established between the level sensor and the overfill and ID detectors.

11. A fluid transfer system according to claim 1 wherein the overfill detector and the ID detector are part of a single microcontroller.

12. A fluid transfer system according to claim 1 further comprising:
    a third tank to which the transfer conduit is connectable to allow fluid flow from the third tank to the first tank;
    a signal generator associated with the third tank which outputs a second signal having a second time-varying characteristic which is indicative of a specific fluid contained within the third tank, the second signal being detectable by the ID detector when the the transfer conduit is connected to the third tank.

13. A fluid transfer system according to claim 12 wherein the ID detector stores a representation of the second time-varying characteristic in place of the reference time-varying characteristic when the transfer conduit is connected to the third tank.

14. A fluid transfer system according to claim 12 further comprising a residual sensor which generates an output signal which is detected by the ID detector and which indicates when the fluid level in the first tank is above a predetermined level.

15. A fluid transfer system according to claim 14 wherein the ID detector compares the second time-varying characteristic to the stored representation of the reference time-varying characteristic and the controller inhibits fluid flow from the third tank to the first tank if:
    the second time-varying characteristic and the reference time-varying characteristic are not sufficiently similar; and
    the residual sensor output signal indicates that the fluid level in the first tank is above said predetermined level.

16. A fluid transfer system for transferring fluid to and from a first tank, fluid transferred out of the first tank being transferred to a second tank via an output conduit and fluid being transferred into the first tank being received from a third tank via an input conduit, flow into and out of the first tank being controlled with a flow controller, the system comprising:
    a level sensor which detects fluid in the second tank and which outputs a first signal indicating whether the fluid level in the second tank is above a predetermined level, the first signal having a first time-varying characteristic which is indicative of a specific fluid for which the second tank is intended;
    an overfill detector which detects the first signal when the output conduit is arranged to allow fluid flow from the first tank to the second tank, and which causes the flow controller to inhibit fluid flow through the output conduit when the first signal indicates that the fluid level in the second tank is above said predetermined level;
    a signal generator which generates a second signal having a second time-varying characteristic which is indicative of a specific fluid contained within the third tank;

an ID detector which detects the first signal when the output conduit is arranged to allow fluid flow from the first tank to the second tank, and which detects the second signal when the input conduit is arranged to allow fluid flow from the third tank to the first tank, the ID detector providing an output indicative of whether a detected signal has a time-varying characteristic which matches a stored representation of a reference time-varying characteristic indicative of a specific fluid type; and a disable device which receives the output from the ID detector and causes the flow controller to inhibit fluid flow into or out of the first tank if said output indicates that the time-varying characteristic of said detected signal does not match the reference time-varying characteristic.

17. A system according to claim 16 wherein the ID detector, while detecting the second signal, stores a representation of the second time-varying characteristic in place of the stored representation of the reference time-varying characteristic if the second time-varying characteristic does not match the reference time-varying characteristic.

18. A system according to claim 16 further comprising a residual sensor located within the first tank which generates an output indicative of whether the fluid level in the first tank is above a residual level.

19. A system according to claim 18 wherein the output of the residual sensor is received by the disable device when the input conduit is arranged to allow fluid flow from the third tank to the first tank, and wherein the disable device causes the flow controller to inhibit fluid flow from the third tank to the first tank when the residual sensor output indicates that the fluid in the first tank is above the residual level and the output from the ID detector indicates that the second time-varying characteristic does not match the reference time-varying characteristic.

20. A method of controlling fluid transfer from a first tank to a second tank through a transfer conduit using a flow controller to control the flow of fluid through the conduit, the method comprising:

detecting fluid level in the second tank with a level sensor;

outputting, from the level sensor, a first signal indicative of whether the fluid level in the second tank is below a predetermined level, the first signal having a first time-varying characteristic which is indicative of a specific fluid for which the second tank is intended;

detecting the first signal with an overfill detector;

generating, with the overfill detector, an overfill signal which causes the flow controller to inhibit fluid flow through the conduit when the first signal indicates that the fluid level in the second tank is above said predetermined level;

detecting the first signal with an ID detector;

comparing the first time-varying characteristic to a stored representation of a reference time-varying characteristic with the ID detector; and generating, with the ID detector, an ID signal which causes the flow controller to inhibit fluid flow through the conduit when the two characteristics are not sufficiently similar.

21. A method according to claim 20 wherein controlling fluid transfer from a first tank to a second tank comprises controlling fluid transfer from a compartment of a tanker truck to a storage tank of a service station.

22. A method according to claim 20 wherein detecting fluid level with a level sensor comprises detecting fluid level with an electro-optic sensor.

23. A method according to claim 20 wherein outputting a first signal comprises outputting a first signal which is a pulsed signal.

24. A method according to claim 20 wherein outputting a first signal having a first time-varying characteristic comprises outputting a first signal having pulses of a specific pulse width.

25. A method according to claim 20 wherein outputting a first signal having a first time-varying characteristic comprises outputting a first signal having a specific duty cycle.

26. A method according to claim 20 wherein outputting a first signal having a first time-varying characteristic comprises outputting a first signal having a specific frequency.

27. A method according to claim 20 further comprising providing an electrical conductor along the length of the transfer conduit by which the first signal is transmitted in electrical form.

28. A method according to claim 27 further comprising conducting vapor from the second tank to the first tank with a vapor recovery hose as fluid is transferred from the first tank to the second tank and providing an electrical conductor along the length of the vapor recovery hose by which an electrical ground path is established.

29. A method according to claim 20 further comprising:

providing a third tank to which the transfer conduit is connectable to allow the transfer of fluid from the third tank to the first tank;

generating, with a signal generator associated with the third tank, a second signal having a second time-varying characteristic which is indicative of a specific fluid contained within the third tank;

detecting the second signal with the ID circuit when the transfer conduit is connected to the third tank; and comparing the second time-varying characteristic to the reference time-varying characteristic.

30. A method according to claim 29 further comprising storing, with the ID circuit, the second time-varying characteristic in place of the reference time-varying characteristic when the transfer conduit is connected to the third tank.

31. A method according to claim 29 further comprising providing a residual sensor which generates an output signal indicative of the fluid level in the first tank being above a predetermined level.

32. A method according to claim 31 further comprising generating, with the ID detector, an ID signal which causes the flow controller to inhibit fluid flow through the conduit when the conduit is connected to the third tank, and when the residual sensor output signal indicates that the fluid level in the first tank is above said predetermined level and the second time-varying characteristic and the reference time-varying characteristic are not sufficiently similar.

* * * * *